United States Patent [19]

Jenkner

[11] Patent Number: 5,667,895

[45] Date of Patent: Sep. 16, 1997

[54] SHOCK ATTENUATION DEVICE

[76] Inventor: Brian D. Jenkner, 22318 Carmack, Marengo, Ill. 60152

[21] Appl. No.: 198,513

[22] Filed: Feb. 18, 1994

Related U.S. Application Data

[63] Continuation-in-part of Ser. No. 769,618, Oct. 1, 1991, abandoned.

[51] Int. Cl.[6] ........................................ B32B 27/00
[52] U.S. Cl. ...................... 428/424.4; 36/29; 36/43; 36/44; 74/55; 74/56; 251/54; 251/263; 369/246; 267/34; 267/136
[58] Field of Search ........................... 36/44, 43, 3 R, 36/29; 428/424.4; 251/48, 54, 251, 335.3, 263; 369/246–248; 74/53, 54, 55, 56.4; 267/34, 136

[56] References Cited

U.S. PATENT DOCUMENTS

| | | | |
|---|---|---|---|
| 4,252,910 | 2/1981 | Schaefer | 521/145 |
| 4,471,538 | 9/1984 | Pomeranz et al. | 36/28 |
| 4,483,332 | 11/1984 | Rind | 128/89 |
| 4,590,689 | 5/1986 | Rosenberg | 36/3 B |
| 4,817,304 | 4/1989 | Parker et al. | 36/114 |
| 4,957,168 | 9/1990 | Battista | 168/4 |
| 5,183,292 | 2/1993 | Ragin, III | 280/825 |
| 5,379,990 | 1/1995 | Ando et al. | 267/34 |
| 5,432,000 | 7/1995 | Young, Sr. et al. | 428/372 |
| 5,472,169 | 12/1995 | Forney et al. | 251/54 |
| 5,498,478 | 3/1996 | Hansen et al. | 428/372 |

OTHER PUBLICATIONS

Taiwanese Patent Office communication dated Jul. 12, 1995. a translation of the above communication.
Davidson, *Handbook of Water Soluble Gums and Resins,* selected portions from Chapter 17, 1980.

*Primary Examiner*—Merrick Dixon
*Attorney, Agent, or Firm*—Juettner Pyle Lloyd & Piontek

[57] ABSTRACT

A device contains a super absorbent hydrophilic polymer in combination with a compatible liquid to form a thick, viscous gel-like colloidal fluid to provide high durability, low cost, and ready manufacture in footwear, medical applications, including surgical padding, flotation sleeping devices, and other applications for the dissipation of shock or load over time and/or an area.

7 Claims, No Drawings

SHOCK ATTENUATION DEVICE

The present application is a continuation-in-part patent application of patent application Ser. No. 07/769,618, filed Oct. 1, 1991, abandoned.

BACKGROUND OF THE INVENTION

1. Field of the Invention

The invention relates to a device to attenuate shock loads and distribute loading and, more particularly, to an improved shock attenuating and/or load distribution device having an outer membrane or displacable structure wherein the material is a viscous colloid formed from a solution of super absorbent hydrophilic polymers and a liquid, such as water, for use in footwear, medical, and other applications.

2. Description of the Prior Art

The search for cost effective shock absorbing and load distribution devices for various applications has been an on-going quest over the years and has resulted in a number of innovations, especially in the athletic footwear and medical fields. These innovations focused on the problems created by impact loads generated during running or walking, as well as the problems created by concentrated loads suffered by ambulatory medical patients and those using prothestic devices.

Running or jumping, especially during activities such as aerobics, causes very high localized loading of the human foot and ankle areas which can contribute to injury of the foot, ankle, associated joints such as foot, ankle and knee joints and leg bones. Consequently, product innovations in this area in recent years have rapidly developed in an effort to alleviate these problems. An added desirable feature of these innovations has been the introduction of comfort and fit improvements in the athletic footwear. Additionally, efforts to relieve the discomfort and localized injury caused by bedridden medical patients and those using load-bearing artificial limbs have been of great interest.

The typical solutions, to date, have included the use of ampules or pads formed from a flexible outer membrane hermetically filled with a liquid of an appropriate viscosity or a gas such as air, which is then inserted into the footwear or medical appliance at locations experiencing the greatest loading. Various membrane materials have been employed, as have a wide range of fillers. Filler liquids have included water, glycol mixtures, glycerine, various oils and other relatively low viscosity liquids. Furthermore, higher viscosity liquids or gels, in an effort to improve the hydrostatic properties of the liquid, have incorporated semi-solids such as organosiloxane gels as the shock absorbing or load distributing material, such as those silicone gels disclosed in U.S. Pat. No. 4,768,295 to Ito. Gas fillers have typically used enclosed pockets of air. Whereas in the past these devices used liquids, gels, or air, depending on the desired viscosity, none apparently offered the cost effective shock attenuation and load distribution performance of the present invention.

For many years, therefore, a search for a cost effective solution to the problems solved by the present invention has been afoot. Thus, there clearly was a long-felt, yet unfulfilled need for the solution to these problems obtained by the present invention. Moreover, the art testifies to the failure of the efforts of others to solve the problems as satisfactory and as cheaply as does the present invention.

Therefore, improvements were generally sought to produce shock attenuating and load distribution devices of high durability, low cost, and ready manufacture for use in footwear, medical applications and other applications where the dissipation of load over time and/or an area is desired. To this end, as an aspect of the invention described herein, the feasibility of applying the concept of using super absorbent hydrophilic polymers, together with a compatible liquid, to constitute a low cost viscous colloidal fluid as the shock attenuating and load distribution material was examined. Although the theory and underlying physical phenomena represented by the non-Newtonian fluid of the present invention is now not completely understood, it was discovered that shock attenuating devices formed from a resilient membrane and filled with a super absorbent hydrophilic polymer and compatible liquid mixture offer excellent performance characteristics in the dissipation and distribution of loading, while simultaneously offering an inexpensive and readily manufacturable product.

Previously, super absorbent hydrophilic polymers have long been used in applications to absorb various liquids for ready and efficient disposal in articles such as diapers, sanitary napkins, bedding pads and the like. These super absorbent hydrophilic polymers, uniquely suited to such applications, are generally hydrophilic and absorb an enormous quantity of liquid relative to its mass through capillary action. Although such super absorbent hydrophilic polymers are known for absorbing liquids, nothing in the prior art suggested that super absorbent hydrophilic polymers suspended in a compatible liquid to form a colloidal fluid within a resilient member would be a solution to the problems solved by the present invention.

OBJECTS OF THE INVENTION

Accordingly, it is an object of this invention to provide a cost effective shock absorbing and load distribution device for various applications, especially in the footwear and medical fields.

It is also an object of this invention to provide a device for shock absorption and load distribution for a wide variety of applications manufactured from a material that is inexpensive, easy to handle and durable.

It is a further object of this invention to provide a device for shock absorption in athletic footwear.

It is also an object of this invention to provide good comfort and fit through a shock absorption and load distribution device produced with a super absorbent hydrophilic polymers and compatible liquid to form a colloidal fluid placed within a conformable bladder having also located therein low density filler material to lower the overall bladder density.

Other objects, advantages, and features of the present invention will become apparent upon reading the following detailed description and appended claims.

SUMMARY OF THE INVENTION

In accordance with this invention, a super absorbent hydrophilic polymer and compatible liquid forms a thick, viscous gel-like colloidal substance of high durability, low cost, and ready manufacture which can be used in footwear, medical applications, including surgical padding, flotation sleeping devices, and other applications for the dissipation of load over time and/or an area. Additionally, processes for the manufacture and use of same were developed using super absorbent hydrophilic polymers, together with a compatible liquid, contained within a resilient member or articulate structure, such as a conventional piston-like shock absorber, to form a viscous colloidal fluid as the shock attenuating and load distribution material. An additional feature of the present invention is the ability to control the viscosity of the colloidal fluid over an nearly infinite viscosity range.

The use of super absorbent hydrophilic polymers in devices for shock absorption or load distribution for the first time enables the economical manufacture of effective devices having superior energy recovery characteristics suitable for such applications. Significantly, these desirable performance characteristics in the dissipation and distribution of dynamic and static loads are especially manifest by the use of super absorbent hydrophilic polymers. These polymer materials are characterized by a capacity to absorb a high quantity of liquid relative their own mass to form a viscous colloidal fluid easily insertable into an empty pouch or bladder for shock dissipation and load distribution. Examples of super absorbent hydrophilic polymers include those hydrocolloids disclosed and set forth in U.S. Pat. Nos. 3,661,815, 3,900,378, 4,798,603, 4,994,037, 4,988,344, 4,838,885, and 5,013,309 and various combinations thereof, which can be advantageously employed as appropriate super absorbent hydrophilic polymers according to the present invention. The amount of distilled water which can be absorbed by super absorbent hydrophilic polymers typically extend for beyond at least milliliters of distilled water to about one gram of super absorbent hydrophilic polymer, constituting a rate of absorption far greater than other, more conventional materials. The total absorbency of a particular super absorbent hydrophilic polymer is dependant on the particular liquid used—therefore, herein, distilled water will be recited as a baseline datum.

At these ratios of liquid mass to super absorbent hydrophilic polymer mass, it was discovered that a viscous colloidal fluid resulted which was easily inserted into an empty bladder or displacable structure. Moreover, it was further noted that a bladder containing such a colloidal solution of super absorbent hydrophilic polymers and a compatible liquid, such as water, exhibited superior damping and stress/strain characteristics ideally suited to shock dissipation and load distribution. Alternatively, the super absorbent hydrophilic polymer can be introduced into the resilient member or displacable structure in a dry or powdered form and a compatible liquid subsequently added to simplify manufacture.

DETAILED DESCRIPTION OF THE PREFERRED EMBODIMENTS

The invention herein disclosed involves the use of super absorbent hydrophilic polymers mixed with a compatible liquid to form a viscous colloidal fluid which can be inserted into a sealed compartment capable of some distortion or volume displacement to absorb mechanical energy or distribute a load over a large area. Thus the present invention is based on the desire to develop a device incorporating a mixture that is stable when exposed to wide temperature ranges to maintain a very viscous (jelly-like) colloidal fluid as a padding or a damping device.

Several super absorbent hydrophilic polymer compositions have been developed which are suitable for this task. The preferred composition is WATER-LOCK A-100® manufactured by Grain Processing Corporation, a starch-graft polymer powder fabricated from sodium acrylate-co-acrylamide. Alternative nomenclatures for sodium acrylate-co-acrylamide include: 1) alkali metal carboxylate salts of a starch-polyacrylonitrile graft copolymers, 2) saponifated starch-polyacrylonitrile graft copolymers, and 3) starch-graftpoly(sodium aerylate-co-acrylamide), as variously described in U.S. Pat. No. 3,661,815 and commercial descriptions of the commercially known "WATER-LOCK 100®".

This specific preferred material has the following relevant physical properties:

| Absorbency | |
| --- | --- |
| Distilled Water (ml/g) | 175 |
| 1% NaCl Solution (ml/g) | .50 |
| Volatiles (%) | 3 |
| pH | 7.7 |
| Wet-Out Time (seconds) | 175 |
| Particle Size | |
| On 20 mesh (%) | <1 |
| On 40 mesh (%) | 3 |
| On 80 mesh (%) | 14 |
| On 120 mesh (%) | 12 |
| On 200 mesh (%) | 22 |
| On 270 mesh (%) | 18 |
| On Pan (%) | 30 |

Other materials capable of absorbing of a liquid in amounts several times their own mass to form a viscous colloidal fluid may be developed for use according to the present invention, such as those cited herein. For example, additional polymers, such as those disclosed and set forth in U.S. Pat. Nos. 3,900,378 to Yen, 4,798,603 to Meyer et al., 4,994,037 to Bernardin, 4,988,344 to Reising et al., 4,838,885 to Bernardin, and 5,013,309 to Baigas, Jr. et al., and various combinations thereof can be advantageously employed and are specifically set forth as being contemplated as being within the scope of the present invention.

The preferred super absorbent hydrophilic polymer, when mixed with the compatible liquid to form the viscous colloidal fluid, is readily pumpable and can be first prepared and the viscous colloidal fluid subsequently injected into an opening in the cavity and subsequently sealed. Alternatively, the powdered super absorbent hydrophilic polymer can first be introduced into a sealed cavity wherein the compatible liquid is injected into the sealed cavity at a later time.

"Super absorbent hydrophilic polymers", as that term is used herein and as the term has come to mean in the technical arts, is that class of hydrophilic polymers capable of absorbing several times their own mass in liquids to form an essentially insoluble colloidal fluid. In such hydrophilic polymers, the polymer molecule actually bonds to the liquid, such as water, instead of merely trapping the liquid in interstitial voids. The precise mount to be absorbed is dependant on the specific super absorbent hydrophilic polymer used and the compatible liquid to be absorbed. Examples of such super absorbent hydrophilic polymers includes those materials disclosed in U.S. Pat. Nos. 3,661, 815 to Smith, 3,900,378 to Yen et al., 4,798,603 to Meyer et at., 4,994,037 to Bernardin, 4,988,344 to Reising et al., 4,838,885 to Bernardin, and 5,013,309 to Baigas, Jr. et at., and various combinations thereof, the disclosures of which are herein incorporated by reference in their entirety, and various combinations thereof.

Super absorbent hydrophilic polymers are generally prepared by polymerizing one or more monomers. To render them water-insoluble and suitable for the present invention, these polymers or mixture of polymers are typically reacted, frequently with a crosslinking agent, to form crosslinked polymers, thereby introducing a limited water-insolubility while retaining susceptibility to swelling in water and water-containing fluids. Pseudo-crosslinking may also be achieved by chain entanglement of high-molecular weight polymers, thus effecting water insolubility.

These super absorbent hydrophilic polymers, also otherwise known as hydrocolloids, as referred to herein, are specifically that class of materials capable of absorbing at least 15 milliliters of distilled water to about one gram of super absorbent hydrophilic polymer (15:1) to thereby create a colloidal fluid. Although the current upper range of absorption normally does not normally exceed ratios of 175 milliliters of distilled water to about one gram of super absorbent hydrophilic polymer (175:1), it is considered within the scope of this invention that absorption rates higher than 175:1can be advantageously employed (i.e., some hydrocolloids are capable of absorbing 800 times their own mass of distilled water).

A wide variety of polymers can be employed, the only limitation being that they are capable of cross-linking in the presence of water to form an essentially insoluble gel which can undergo dehydration and hydration reversibly. Illustrative hydrophilic polymers (or hydrocolloids) which can be employed include, among others, Poly(ethylene oxide), Polyvinyl pyrolidone, Polyacrylamides, Anionic polyacrylamide, Polyvinyl alcohol, Maleic anydydride-vinylether copolymers, Poly acrylic acid, and variations thereof, such as methacrylic acid, Alkali metal salts of poly acrylic acids, Ethylene-maleic anhydride copolymers Polyvinyl ethers, Dextran, Gelatin, Hydroxy propyl cellulose, Methyl cellulose, Carboxymethyl cellulose, Hydroxy ethyl-carboxymethyl cellulose, Hydroxy ethyl cellulose, Propyleneglycol alginate, Sodium alginate, Polyethyleneimine, Polyvinyl alkyl pyridinium halides, e.g., polyvinyl-n-butyl-pyridinium bromide, Polyproline, Natural starches, Casein, Proteins, Polymethacrylic acid, Polyvinyl sulfonic acid, Polystyrene sulfonic acid, Polyvinylamine, Ammonium polyacrylates, Hydroxy alkyl acrylates, Hydroxy alkyl methacrylates, Hydroxy alkoxyalkyl acrylates, Hydroxy alkoxyalkyl methacrylates, Polyethylene oxide adduct esters of acrylic and methacrylic acids, Alkoxy acrylates and methacrylates, Alkoxyalkyl acrylates and methacrylates, Partially hydrolyzed polyacrylamides, Poly-4-vinyl pyridine, polymerized monoesters of olefinic acids, polymerized diesters of olefinic acids, acrylamide and difunctional polymerizable materials, e.g., diacids, diesters or diamides, and the like Ethylene maleic anhydride, Polymers and copolymers of vinyl sulfonic acid, Polyacrylates, Hydrolyzed acrylonitrile grafted starch, Acrylic acid grafted starch, isobutylene maleic anhydride copolymers, and mixtures thereof, Potassium based hydrolyzed starch, Sodium polyacrylate Polyvinyl morpholine, and polyvinyl paradene and the like.

It should be noted that the instant invention is not limited to the use of only one of the materials listed above, can include mixtures of two or more polymers. Additionally, it is also possible to employ copolymers of the aforementioned compounds or materials similar to these. For example, copolymers of ethylene oxide and minor or major amounts of other alkaline 3-oxides can also be used. Commercially, suitable materials are available from various commercial vendors, such as Dow Chemical Company, Celanese Corporation, Allied-Colloid, and Stockhausen. Other materials are available under such trademarks WATER LOCK® from Grain Processing Company (as noted above); Klucel-H or K® by Aqualon Company; ARABSORB® 720 from Arakawa Chemical, Inc. (U.S.A.); and Cellosize® by Union Carbide; and AQUALIC-CA® from Nippon Shakubai/ Japanese Catalytic Chemical Company.

Typically, the high-absorbency material is capable of absorbing at least about 15 times its weight in water, and preferably is capable of absorbing at least about 25–50 times its weight in water.

An example of the low cost of super absorbent hydrophilic polymers, the compatible liquids within which it is suspended (i.e., water) and the resilient member which can form the claimed compartment and cavity (preferably ethylene vinyl acetate or "EVA") is manifest in a comparison to the material costs of inferior alternative materials potentially available. For example, silicone presently costs about $59.00 per gallon of usable fluid. In comparison, super absorbent hydrophilic polymers (specifically WATERLOCK A400® produced by Grain Processing) costs about $2.00 per gallon of usable fluid. The material savings provided by the use of such super absorbent hydrophilic polymers in any volume of manufacture is simply enormous. This cost savings also allows the cost effective manufacture of larger chambers for super absorbent hydrophilic polymers for useful applications, further improving the performance of the product.

The preferred embodiment of the present invention includes the addition of agitation of the viscous colloidal fluid to form air bubbles in the space within the sealed cavity. Thus, the ratio of volume to mass can be increased and the overall density of the sealed chamber and the overall weight of the final product can be decreased. Moreover, the addition of the air bubbles adds pneumatic cushioning to the operational characteristics of the viscous colloidal fluid, which tends to improve its performance as a shock absorbing material. Alternatively, other gases may be introduced by gas injection and other means into the viscous colloidal fluid to serve the same function. It has been found, for example, that larger molecule gases, such as argon, tend to have slower permeation rates through various films, such as EVA film, and tend to remain dispersed longer within the device. Moreover, polyurethane films and EVA films have relatively higher permeation rates with carbon dioxide. Therefore, with careful selection of specific gases with specific films, the gases can be retained for a longer period.

One embodiment of the present invention also includes the addition of ceramic or polystyrene balls or other low density materials to the viscous colloidal fluid to occupy space in the sealed cavity with material having a large volume and low mass. Thus, the overall density of the sealed chamber and the overall weight of the final product can be decreased. Further, fibers or inert powders may be added to calibrate the structural features of the colloidal fluid and customize its flow properties.

A further feature of the present invention is that coloring can be easily added to the viscous colloidal fluid to obtain a desired color if the resilient membrane or displacable structure is transparent. The basic tan color of the preferred super absorbent hydrophilic polymer can thus be readily modified for appearance or color coordination purposes. Finally, as an aid during the filling processes, a surfactant or foaming agent may be added. This also will aid bubble formation, which is disclosed elsewhere herein.

EXAMPLES

The following Examples 1–9 illustrate the use of super absorbent hydrophilic polymer with a variety of liquids. All of the following Examples 1–9 used an initial mixture of 65 milliliters of the stated liquid in a container containing 1 gram of the super absorbent hydrophilic polymer (obtained from a super absorbent hydrophilic polymer commonly used in disposable diapers). On the basis of these examples, it was determined that the viscosity of the viscous colloidal fluid can be predictably modified to specific needs depending on the final application by increasing or decreasing the amount of super absorbent hydrophilic polymer added relative to the type and amount of liquid utilized.

EXAMPLE 1

Pure distilled or tap water showed very good absorption to form a gel-like consistency. The viscosity is readily varied by the mass percentage of super absorbent hydrophilic polymer added.

EXAMPLE 2

A mixture of 65 percent water and 35 percent ethylene glycol showed reduced absorption in comparison to water, yet yielded a suitable gel-like fluid. Additional mass ratios of super absorbent hydrophilic polymer would be recommended for higher viscosities. Importantly, this liquid adds the benefit of freeze resistance to the viscous colloidal fluid.

EXAMPLE 3

A mixture of 65 percent water and 35 percent propylene glycol generally showed the same behavior as ethylene glycol. However, propylene glycol showed the best behavior and is a preferred component of the compatible liquid owing to its relative low cost, freeze resistance and relative safety, in addition to forming a colloidal fluid of the proper viscosity. Further, it was observed that when placed in an oven heated to 170° for 24 hours, the viscous colloidal fluid tended to thicken and obtained characteristics different than those desired for shock absorption and load distribution.

EXAMPLE 4

A liquid comprising a 1 percent sodium chloride solution of water showed reduced absorption, but still resulted in a suitable gel-like fluid.

EXAMPLE 5

A liquid comprising a 3 percent sodium chloride solution of water and thus representing a higher salt content required additional super absorbent hydrophilic polymer to obtain a suitable gel-like fluid.

EXAMPLE 6

A liquid comprising a 1 percent calcium chloride solution of water acted much like the 1 percent sodium chloride solution and tended to lower the freezing temperature of the viscous colloidal fluid.

EXAMPLE 7

Mineral oil showed no visible absorption or thickening and is not considered a viable liquid for use with super absorbent hydrophilic polymers.

EXAMPLE 8

Corn oil showed no visible absorption or thickening and is not considered a viable liquid for use with super absorbent hydrophilic polymers.

EXAMPLE 9

Corn syrup showed no visible absorption or thickening and is not considered a viable liquid for use with super absorbent hydrophilic polymers.

EXAMPLE 10

A mixture of 2000 milliliters of tap water and 2000 milliliters of propylene glycol was mixed with 90 grams of WATER LOCK A-100® by Grain Processing Corp. The viscosity of the viscous colloidal fluid was found to be quite acceptable in accordance with the current commercial embodiment of the present invention and as a baseline (i.e., 17,000 to 18,000 cps), became gel-like almost instantly, making it appropriate for production purposes.

EXAMPLE 11

A mixture of 2000 milliliters of tap water and 2000 milliliters of propylene glycol is mixed with 90 grams of Cellosize® by Union Carbide (a absorbent hydrophilic polymer known as hydroxy ethyl cellulose). The viscosity of the viscous colloidal fluid was found to be acceptable in accordance with the current commercial embodiment of the present invention and as a baseline (i.e., 17,000 to 18,000 cps), but took about two to three minutes to thicken.

EXAMPLE 12

A mixture of 2000 milliliters of tap water and 2000 milliliters of propylene glycol is mixed with 40 grams of Cellosize® by Union Carbide and 50 grams of WATER LOCK A-100® by Grain Processing Corp. The viscosity of the viscous colloidal fluid was found to be acceptable in accordance with the current commercial embodiment of the present invention and as a baseline (i.e., 17,000 to 18,000 cps).

EXAMPLE 13

A mixture of 1000 milliliters of propylene glycol and 1000 milliliters of tap water is mixed with 45 grams of WATER LOCK A-100® by Grain Processing Corporation. The viscosity of the viscous colloidal fluid was found to be acceptable in accordance with the current commercial embodiment of the present invention and as a baseline (i.e., 17,000 to 18,000 cps).

EXAMPLE 14

A mixture of 1000 milliliters of propylene glycol and 1000 milliliters of tap water is mixed and 40 grams WATER LOCK A-100® by Grain Processing Corporation with 5 grams of Klucel-H or K® by Aqualon Company. The viscosity of the viscous colloidal fluid was found to be acceptable in accordance with the current commercial embodiment of the present invention and as a baseline (i.e., 17,000 to 18,000 cps). As Klucel® is insoluble at 113° F., it is anticipated that this mixture may separate at lower viscosities (i.e., below 15,000 cps) and at higher temperatures.

EXAMPLE 15

A mixture of 2000 milliliters of glycerine was replaced for propylene glycol and mixed with WATER LOCK A-100® by Grain Processing Corporation. The viscosity of the viscous colloidal fluid was found to be acceptable in accordance with the current commercial embodiment of the present invention and as a baseline (.i.e., 17,000 to 18,000 cps). However, the net weight of the glycerine (for 55 gallons USP) was 570 pounds. The net weight for propylene glycol in the same quantity is 480 pounds USP.

EXAMPLE 16

Independent energy recovery testing was conducted by according to ASTM Standard MIL-P-26514F Polyurethane Foam, Rigid or Flexible, for Packaging, Section 3.13 (Dynamic Cushioning Properties) using identical bladders (save the fluid contained therein) fashioned from EVA film having a thickness of 1.4 mm. and having identical shapes. This test measures the percentage of energy return and peak G experienced by the system. The fluid viscosity in each of the bladders was 15,000 to 20,000 cps.

The use of super absorbent hydrophilic polymers as set forth in Example 10 resulted in at least a five (5) percent improvement in energy recovery over silicone gel, while at the same time providing a lower peak G.

The silicone samples included two identical bladders filled with General Electric Silicone Polymer RTV 6166A and General Electric Silicone Curing Agent RTV 6166B, properly mixed in accordance with manufacturer instructions (the "1.4 Clear 6166" samples) and the samples according to the present invention included three identical bladders filled with WATER LOCK 100® prepared in accordance with Example 2 of the Specification and entrained with normally occurring air bubbles formed during the mixing process (the "Yellow CP17-1.4" samples). Each of the samples were subjected to five dynamic tests.

The results of the testing showed an average energy return in the silicone samples of 46.68 percent, with an average peak G of 214.4 Gs. In contrast the samples according to the present invention obtained an average energy return of 48.96 percent with an average peak G of 208.3 Gs. Thus, the present invention showed a statistically significant 5 percent improvement in energy return, while simultaneously offering a 3 percent decrease in peak loading.

Normally, as peak loading (shock attenuation) drops, so does energy return. Here, however, is a material capable of reducing peak loading while increasing energy returns. Thus, improved absorption of initial impacts with higher energy return is obtained. Further, the higher energy return for any given peak load allows the further adjustment of peak load downward (through viscosity adjustments, which will be discussed below) without significantly sacrificing energy return.

Moreover, the burst strength for otherwise identical bladders filled with silicone gel was not found to be measurable, as the silicone would not allow a perfect seal of the bladder under higher pressures, unlike the super absorbent hydrophilic polymer of the present invention.

Further, the viscosity of the silicone gel is difficult to control. Special chemical additives or diluents are required to effect silicone viscosity charges. In terms of load distribution, viscosity can be a critical factor, especially in dynamic systems. Therefore, to vary viscosity from application to application using silicone, an entire new range of processing steps must be added. However, in the case of super absorbent hydrophilic polymers, merely varying the amount of compatible liquid in proportion to a single super absorbent hydrophilic polymer has been found quite effective to yield a variety of desirable viscosities. In the manufacturing environment, this simplicity is quite important.

APPLICATIONS

It is intended that the greatest utility of this invention will be in bladders constructed from resilient films or flexible polymers and filled with the viscous colloidal fluid obtained from super absorbent hydrophilic polymer mixtures. The preferred bladder material is an outer membrane constructed of ethylene-vinyl-acetate films. Alternatively, thermoplastic urethane films, polyvinyl chloride films, chlorinated polyethylene films, Hytrel® films by DuPont, Santoprene® films by Monsanto, and other thermoplastic film laminates may be used. However, it is expected that virtually any reasonably strong flexible material will be satisfactory, so long as its burst strength and sealing capabilities are sufficient for its intended application. Importantly, the shape and configuration of the bladder can be formed to whatever the shock absorption or load distribution application requires.

The liquids considered compatible in application to the present invention include water, ethylene glycol, propylene glycol, glycerine, various solutions of salt water, and various mixtures and combinations thereof. The only requirement with respect to the liquid component is that the liquid be capable of forming a viscous colloidal fluid when mixed with the super absorbent hydrophilic polymer. For example, in the preferred, commercial embodiment of the present invention, the liquid composition is 48% propylene glycol, 2% glycerine and 50% distilled water. Glycerine has been found useful as an agent to disperse colorants, owing to its higher specific gravity.

The viscous colloidal fluid as placed in a resilient bladder can be incorporated into the device to absorb shock and/or distribute load. One very beneficial application is as a component for footwear, especially athletic shoes. The bladder can be used in the shoe sole as a shock absorbing device for the mechanical energy developed by the user, or it can also be used to improve the fit and comfort of footwear by being located at other stressed portions of the footwear in proximity to the user, for example as an ankle support which is displacable within the shoe bladder as a result of lacing the shoes to a snug fit. Super absorbent hydrophilic polymers require only the addition of the compatible liquid as disclosed in the Examples set forth above. Preferably, gas is entrained in the colloidal fluid during mixing to improve shock attenuation and load distribution. However, fundamentally, super absorbent hydrophilic polymers are "mix and use" materials having an nearly infinite pot life, no temperature or humidity limitations, and no cure time setup restrictions.

In contrast, silicone has been found to be a relatively difficult material to work with. It must be carefully handled and mixed as a polymer and curing agent. For example, in the case of the silicone of Example 20, temperature and humidity are critical factors, especially in the presence of viscosity additives. Moreover, silicone has a very limited pot life (in some cases merely 2 hours) and a considerable cure time (24 hours at 150° C.). Also, as noted above, silicone is difficult to seal within a bladder. The presence of silicone in the location of the seal prevents virtually any form of sealing integrity. Conversely, the super absorbent hydrophilic polymers of the present invention have shown a remarkable tolerance for allowing a seal even in the presence of fill residue. Thus, should complete filling of the cavity be desired, overflow of the present invention does not prevent subsequent sealing.

Also, the safety advantages obtained through the use of the super absorbent hydrophilic polymers of the present invention as applied are clearly not be discounted. A simple comparison of silicone to the materials of the present invention indicates the relative safety of the present invention to users, manufacturing employees, and others. Moreover, the widely publicized health concerns involving the use of silicone in or about the human body are a disadvantage.

A further application of the bladder concept is in devices used in the medical fields, such as surgical padding, which allow the patient's body weight to be more evenly distributed over a wider area and thereby reduce the unit stress on specific portions of the body.

Additionally, the bladder can be incorporated into a padding structure for wheel chairs, thereby reducing the stress on an individual.

Also, it is comtemplated in accordance with the present invention that a bladder can be incorporated into as an implant for cosmetic or other purposes, with the proper human tolerance to the specific super absorbent hydrophilic polymer and compatible liquid.

A further application of the present invention may be floatation sleeping devices, such as waterbeds, to minimize wave motion. As many such devices now employ complicated and expensive baffling systems, a simple viscous colloidal fluid such as disclosed by the present invention can provide a significantly reduced cost system.

Also, it is anticipated that the viscous colloidal fluid of the present invention may be advantageously employed as a damping material with an articulate structure, such as a conventional piston-like shock absorber, in various applications to dampen loads. As many such piston-like shock absorbers now use oil or other hydraulic fluids, the stress/strain characteristics of the viscous colloidal fluid of the present invention containing super absorbent hydrophilic polymer may be a less expensive alternative where the hydraulic fluid is replaced therewith. In those cases where a piston-like shock absorber is employed, it will be apparent to those skilled in the art that the present invention offers significant advantages. As the viscosity of the colloidal fluid of the present invention is readily controllable, the flowability of the colloidal fluid within a piston/orifice or piston/reservoir configuration can be likewise calibrated for the benefits sought. Further, with the addition of a gas into in the colloidal fluid, the compressibility of the colloidal fluid can be enhanced and used in such applications as a closed-end piston configuration.

Resilient cavity should be understood to mean any compartment capable of distortion or volume displacement to absorb mechanical energy or distribute a load over an area or a compartment capable of distortion or volume displacement to absorb mechanical energy or distribute a load over an area.

Importantly, the viscous colloidal fluid of the present invention can be used in virtually an infinite number of other applications where the dissipation of load over time and/or an area is desired. Accordingly, the recitation of applications noted above is not to be considered a limitation of the possible applications for the present invention.

It will be understood that the details, materials and arrangements of parts of specific embodiments have been described to explain the nature of the invention. Changes may be made by those skilled in the art without departing from the invention as expressed in the appended claims.

What is claimed is:

1. A shock absorption or load distribution device comprising:
   a distortable or volume displaceable compartment for absorbing mechanical energy or distributing a load over an area and sealingly retaining a fluid therein; and
   a compatible liquid absorbed by a super absorbent hydrophilic polymer forming a viscous colloidal fluid of a desired and controllable viscosity, wherein the desired and controllable viscosity is adjustable within a range of selectable viscosities by regulation of the ratio of the compatible liquid to the super absorbent hydrophilic polymer;
   the compartment being filled with the viscous colloidal fluid to form the shock absorbing or load distribution device.

2. The invention of claim 1, wherein the compatible liquid includes those selected from the group consisting of water, ethylene glycol, glycerine, propylene glycol, various solutions of salt water, and mixtures thereof.

3. The invention of claim 1, wherein the compartment for absorbing mechanical energy or distributing a load over an area and sealingly retaining a fluid therein comprises a component of an article of footwear.

4. A shock absorption or load distribution device comprising:
   a cavity having a resilient outer membrane; and
   a compatible liquid absorbed by a super absorbent hydrophilic polymer forming a viscous colloidal fluid of a desired and controllable viscosity, wherein the desired and controllable viscosity is adjustable within a range of selectable viscosities by regulation of the ratio of the compatible liquid to the super absorbent hydrophilic polymer;
   the cavity sealingly containing the viscous colloidal fluid to form the shock absorbing or load distribution device.

5. The invention of claim 4, wherein the cavity having a resilient outer membrane comprises a component of an article of footwear.

6. A shock absorbing or load dissipation device comprising a flexible enclosure means for containing a liquid and a viscous colloid of a desired and controllable viscosity within the enclosure means, the viscous colloid comprising a super absorbent hydrophilic polymer and a compatible liquid mixed therewith;

the super absorbent hydrophilic polymer absorbing the compatible liquid to form the viscous colloid of the desired and controllable viscosity within a range of selectable viscosities by regulation of the ratio of the compatible liquid to the super absorbent hydrophilic polymer.

7. The invention of claim 6, wherein the enclosure means comprises a component of an article of footwear.

* * * * *